(12) United States Patent
Kamioka et al.

(10) Patent No.: US 8,981,735 B2
(45) Date of Patent: Mar. 17, 2015

(54) POWER SUPPLY SYSTEM FOR MOTOR VEHICLE PROVIDED WITH CONTROL DEVICE OF VOLTAGE APPLIED TO FIELD COIL OF GENERATOR

(75) Inventors: Nozomu Kamioka, Chiyoda-ku (JP); Shinji Nishimura, Chiyoda-ku (JP); Noriyuki Wada, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 817 days.

(21) Appl. No.: 12/956,387

(22) Filed: Nov. 30, 2010

(65) Prior Publication Data

US 2011/0248687 A1 Oct. 13, 2011

(30) Foreign Application Priority Data

Apr. 9, 2010 (JP) .................................. 2010-090383

(51) Int. Cl.
  *H02P 9/10* (2006.01)
  *H02P 9/48* (2006.01)
  *H02J 7/16* (2006.01)
  *F02N 11/08* (2006.01)

(52) U.S. Cl.
  CPC ... *H02P 9/48* (2013.01); *H02J 7/16* (2013.01); *H02J 7/163* (2013.01); *F02N 11/0862* (2013.01)
  USPC ..................... 322/60; 322/28; 322/89; 322/44

(58) Field of Classification Search
  None
  See application file for complete search history.

(56) References Cited

U.S. PATENT DOCUMENTS

| | | | | |
|---|---|---|---|---|
| 3,870,027 A | * | 3/1975 | Jacobs | 123/598 |
| 4,088,108 A | * | 5/1978 | Hager | 123/605 |
| 4,492,911 A | * | 1/1985 | Molitor | 318/779 |
| 5,373,196 A | * | 12/1994 | Faley | 307/46 |
| 5,418,401 A | * | 5/1995 | Kaneyuki | 307/10.1 |
| 5,874,788 A | * | 2/1999 | McCartney | 307/66 |
| 6,215,277 B1 | * | 4/2001 | Renehan | 320/117 |
| 6,351,104 B1 | * | 2/2002 | Koelle et al. | 322/22 |
| 6,504,346 B2 | * | 1/2003 | Nakamura et al. | 322/90 |
| 6,616,416 B1 | * | 9/2003 | Tolbert, Jr. | 417/45 |

(Continued)

FOREIGN PATENT DOCUMENTS

| | | |
|---|---|---|
| JP | 62-155800 A | 7/1987 |
| JP | 07-264708 A | 10/1995 |

(Continued)

OTHER PUBLICATIONS

Japanese Office Action dated Apr. 20, 2012, issued in Patent Application No. 2010-090383.

*Primary Examiner* — Tulsidas C Patel
*Assistant Examiner* — S. Mikailoff
(74) *Attorney, Agent, or Firm* — Sughrue Mion, PLLC; Richard C. Turner

(57) ABSTRACT

A power supply system for a motor vehicle includes a generator that includes a rotor having a field coil and a stator having an armature coil; a rectifier that rectifies AC power generated in the armature coil; an excitation control circuit that takes control of a voltage applied to the field coil; a capacitor that is connected to the DC side of the rectifier, and receives and transfers the rectified power; a battery connected to an electric load of the motor vehicle; a DC-DC converter that is connected between the capacitor and the battery and capable of converting unidirectionally or bidirectionally an input DC voltage into any DC voltage; and a selection switch which connects the capacitor or the battery to the excitation control circuit as a power supply source.

7 Claims, 6 Drawing Sheets

(56) References Cited

U.S. PATENT DOCUMENTS

| | | | |
|---|---|---|---|
| 7,196,497 B2 * | 3/2007 | Ooiwa | 322/22 |
| 7,366,002 B2 * | 4/2008 | Gupta et al. | 365/100 |
| 7,394,229 B2 * | 7/2008 | Lim et al. | 322/59 |
| 7,999,518 B2 * | 8/2011 | Doffin et al. | 322/28 |
| 8,076,825 B1 * | 12/2011 | Kaajakari | 310/339 |
| 8,378,641 B2 * | 2/2013 | Rozman et al. | 322/24 |
| 2005/0093494 A1 | 5/2005 | Nagayama | |
| 2005/0104544 A1 * | 5/2005 | Ishikawa | 318/139 |
| 2006/0024078 A1 | 2/2006 | Matsusaka | |
| 2006/0232069 A1 * | 10/2006 | Lim et al. | 290/1 R |
| 2006/0266256 A1 * | 11/2006 | Donnelly et al. | 105/61 |
| 2007/0000704 A1 * | 1/2007 | Mertens | 180/65.4 |
| 2007/0108956 A1 * | 5/2007 | Steigerwald et al. | 323/288 |
| 2008/0066979 A1 * | 3/2008 | Carter | 180/65.5 |
| 2010/0148582 A1 * | 6/2010 | Carter | 307/48 |
| 2010/0171470 A1 * | 7/2010 | Doffin et al. | 322/59 |

FOREIGN PATENT DOCUMENTS

| | | | | |
|---|---|---|---|---|
| JP | 2000-023306 A | 1/2000 | | |
| JP | 3606740 B2 | 1/2000 | | |
| JP | 2002-095177 A | 3/2002 | | |
| JP | 2005-143157 A | 6/2005 | | |
| JP | 2006-158173 A | 6/2006 | | |
| JP | 2010-49273 A | 3/2010 | | |
| WO | WO 2008000984 A2 * | 1/2008 | | H02J 7/14 |

* cited by examiner

POWER SUPPLY SYSTEM FOR MOTOR VEHICLE PROVIDED WITH CONTROL DEVICE OF VOLTAGE APPLIED TO FIELD COIL OF GENERATOR

BACKGROUND OF THE INVENTION

1. Field of the Invention

The present invention relates to a power supply system for a motor vehicle that is mounted on the vehicle and used for charging up the battery and capacitor thereof.

2. Description of the Related Art

An in-vehicle AC generator conventionally used as a power supply system for a motor vehicle includes a system in which output from the generator is stepped down by a DC-DC converter so as to charge up the battery mounted on the vehicle (refer to, for example, Japanese Laid-open Patent Publication No. 2002-95177, hereinafter referred to as Patent Document 1). This system is configured in such a way that the field coil is supplied with power obtained from a low voltage output terminal rather than a high voltage output terminal.

Moreover, there is a system as another conventional example in which, using an electric double-layer capacitor, kinetic energy of the vehicle is converted into electric energy so as to regenerate power (refer to, for example, Japanese Patent Publication No. 3606740, hereinafter referred to as Patent Document 2).

A motor vehicle does not need fuel for rotating the engine when decelerating. At this time, rotation force from the wheels is transmitted through its power transmission path to the engine as rotation force therefor. Storing as electric energy this rotation energy, after converted by the generator, enables reduction in the amount of fuel consumed for generating electricity in a region of accelerating, cruising and the like in which fuel is injected to generate electricity. We have devised a system that, by connecting the electric double-layer capacitor described in Patent Document 2 to the high voltage output terminal of the conventional in-vehicle AC generator described in Patent Document 1, can store electricity and reduce the amount of fuel consumption. At this time, the conventional in-vehicle AC generator is configured to obtain from the low voltage output terminal power to be supplied to the field coil, although it is provided with the high voltage output terminal from which power capable of being supplied to the field coil can be obtained. Therefore, a sufficient current can not be produced in the field coil, causing a problem in that energy can not be fully regenerated in a deceleration region of the vehicle.

Moreover, since power for producing a field current needs to be obtained steadily from the low voltage output terminal, a current always flows through a connector portion provided at the output terminal of a step-down circuit, causing a problem of generating heat at the connector portion due to its contact resistance, which has in turn deteriorated reliability. The connector has been made larger so as to reduce the contact resistance as a countermeasure against the problem, whereby, however, the system itself has increased in size, pushing up the cost thereof.

On the other hand, in order to solve the above-described problem, configuring the system so as to obtain power for producing the field current from the capacitor connected to the high voltage output terminal has enabled a maximum voltage capable of being applied to the field coil to increase, compared to the configuration in which a voltage applied to the coil is obtained from the battery connected to the low voltage output terminal. However, the capacitor self-discharges more than the battery, and in addition, the capacitor has characteristics in which the voltage of the capacitor rises depending on the increase in the electricity amount stored therein, differing from those of the battery in which the voltage thereof does not vary so much depending on the increase in the stored electricity amount. Therefore, when the capacitor voltage is extremely low in such cases as the capacitor is left unused for a long time so that its self-discharging progresses and the capacitor is replaced with an uncharged capacitor at a time of maintenance, a sufficient field current required for generating electricity can not be produced, so that the capacitor cannot be charged up on its own.

Furthermore, when the capacitor voltage is not extremely low, but lower than that of the battery, a larger field current cannot be produced compared to a case in which power for producing the field coil current is obtained from the battery; therefore, a sufficient amount of energy cannot be regenerated when decelerating, causing such problems as opportunities for regenerating energy without consuming fuel would be lost.

Now, in order to solve such problems as described above in that the capacitor cannot be charged up when its voltage is low, a method has been devised in which the capacitor is charged up from the battery using a bidirectional DC-DC converter that can bidirectionally convert power from the capacitor into that to the battery or vice versa. However, the battery has characteristics in which extreme reduction in the amount of electricity stored therein extremely shortens the lifetime thereof, and charging up the capacitor needs a large amount of power, which has therefore brought about such negative effects as the amount of electricity stored in the battery is greatly reduced, and resultantly the lifetime of the battery is shortened.

On the other hand, different kinds of metals contact with each other at the connector and soldered portions of the field coil. Since the generator is located in the engine room, it follows that the generator is in such wet environments as dew forms due to change in the ambient temperature and water is splashed there from road surfaces. If a current flows for a long time through different metals with the contact portion of the different metals being wet, the metals become corroded due to electric corrosion. Since the field coil of the conventional system is always connected to the battery via an excitation control circuit, even when the current flowing through the field coil is interrupted by the excitation control circuit, electric corrosion has developed due to a small leak current.

Moreover, since the capacitor charged up by the generator is in a state of electricity being stored, there also has been a problem in that hot-line work must be performed when the capacitor is disconnected from the circuit at a time of vehicle maintenance and the like.

Furthermore, we intended to start the engine by operating the generator as a motor-generator. In the motor-generator, both armature and field coils are energized to produce magnetic flux so as to generate rotation force by repulsion force produced by the magnetic flux. However, when the capacitor voltage is low, a current cannot flow through the field coil, causing a problem in that the generator cannot be operated as the motor-generator.

SUMMARY OF THE INVENTION

The present invention has been made to solve the problems described above, and aims at providing a power supply system for a motor vehicle in which equal or greater power can be regenerated compared to a case in which the field coil is supplied with power obtained from the battery connected to the low voltage output terminal, and the capacitor connected to the high voltage output terminal can be charged up without increasing the system size and resultantly pushing up the cost attributable to the countermeasure against overheating of the connector portion, as well as without regard to the voltage of the capacitor connected thereto.

A power supply system for a motor vehicle according to the present invention comprises: a generator including a rotor that has a field coil and rotates being connected to an engine, and a stator that has an armature coil; a rectifier that rectifies AC power generated in the armature coil into DC power; an excitation control circuit that takes control of a voltage applied to the field coil; a capacitor that is connected to the DC side of the rectifier, and receives and transfers the power; a battery connected to an electric load of the motor vehicle; a DC-DC converter that is connected between the capacitor and the battery and capable of converting unidirectionally or bidirectionally an input DC voltage into any voltage; and a selection switch that is capable of selecting as a power supply source for the excitation control circuit either the capacitor or the battery.

A power supply system for a motor vehicle according to the present invention brings about effects in that equal or greater power can be regenerated compared to a case in which the field coil is supplied with power obtained only from the low voltage output terminal, and in addition, the capacitor can be charged up without increasing the system size and resultantly pushing up the cost attributable to the countermeasure against overheating of the connector portion, as well as without regard to the voltage of the capacitor connected to the high voltage output terminal.

The foregoing and other object, features, aspects and advantages of the present invention will become more apparent from the following detailed description of the present invention when taken in conjunction with the accompanying drawings.

DETAILED DESCRIPTION OF THE PREFERRED EMBODIMENTS

Figure 1:
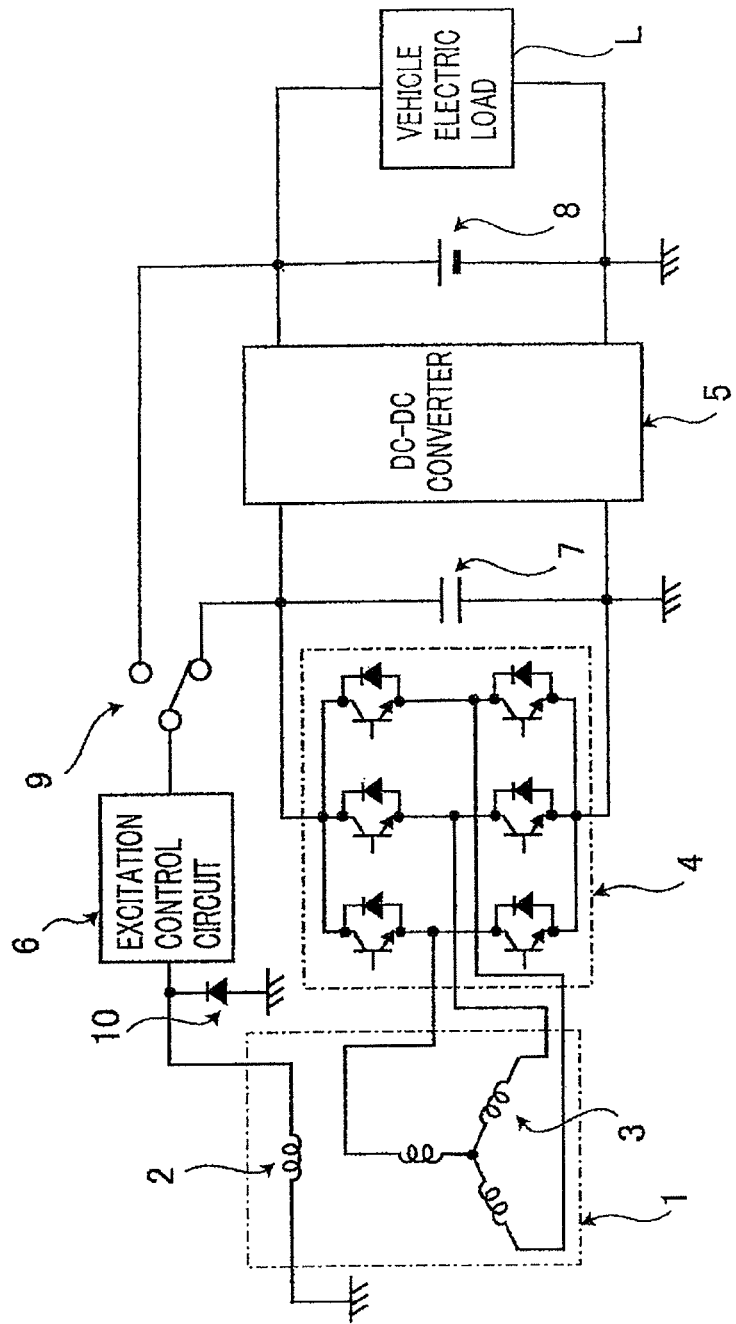
FIG. 1 is a system configurational view of a power supply system for a motor vehicle according to Embodiment 1 of the present invention.

Hereinafter, embodiments of the present invention will be explained in detail referring to the attached drawings. In each drawing, the same reference numeral denotes the same or corresponding part.

Embodiment 1

FIG. 1 is a system configurational view of a power supply system for a motor vehicle according to Embodiment 1 of the present invention. In FIG. 1, a generator 1 is rotated by an engine not shown in the figure and converts kinetic energy into electric energy. The reference numeral 2 denotes a field coil fixed on a rotor located inside the generator 1, which produces magnetic flux by electric power obtained from outside the generator 1. The reference numeral 3 denotes a three-phase armature coil located inside the generator 1, which is fixed on a stator not shown in the figure. When the field coil 2 is rotated by the engine with a voltage being applied to the coil, magnetic flux from the field coil 2 crosses the three-phase armature coil 3, whereby three-phase AC power is generated in the armature coil 3. The reference numeral 4 denotes a rectifier, which serves as a three-phase full-wave rectifier circuit that converts the three-phase AC power generated in the armature coil 3 into DC power. The reference numeral 7 denotes a capacitor that can store the DC power converted by the rectifier 4.

The reference numeral 5 denotes a step-down type DC-DC converter connected to the capacitor 7, which serves as a circuit that converts an input DC voltage into any DC voltage. When the voltage of the capacitor 7 is 100 V, for example, which is the input DC voltage to the DC-DC converter, the DC-DC converter 5 serves as a switching circuit and takes control of PWM (pulse width modulation) with a duty ratio of 14%, whereby the capacitor voltage can be stepped down to 14 V. This DC-DC converter 5 has a function of detecting the input voltage, as well as functions of continuously calculating and controlling the duty ratio so that a relation of duty ratio=14 V/input voltage is maintained to stabilize its output voltage at 14 V.

The reference numeral 6 denotes an excitation control circuit, which takes control of a current flowing through the field coil 2. Specifically, the excitation control circuit has: a function of detecting an input voltage thereto; a function of setting a target field coil current in such a way that the circuit determines, from information such as vehicle speed and engine rotation speed, whether or not the vehicle is decelerating, and if it is decelerating, the target field coil current is set so that a maximum power can be obtained, and other than that, the target field coil current is set so that half of the maximum power can be obtained; a function of setting from the target field coil current a target applying voltage; a function of comparing the input voltage with the target applying voltage; and a function of taking control of the duty ratio of the voltage applied to the field coil 2 depending on the comparison result.

The reference numeral 8 denotes a battery for storing power, which stores power stepped down by the DC-DC converter 5, and the stored power is utilized to energize the electric load L of the vehicle.

The reference numeral 9 denotes a selection switch that selects power supplied to the field coil 2 from either the capacitor 7 or the battery 8. As described above, since the voltage of the capacitor 7 decreases over time due to its self-discharging action, when the voltage of the capacitor 7 is lower than that of the battery 8, the selection switch 9 is switched over to the battery 8 side so that the field coil 2 is supplied with power from the battery 8. Meanwhile, when the voltage of the capacitor 7 is higher than that of the battery 8, the switch 9 is switched over to the capacitor 7 side so that the field coil 2 is supplied with power from the capacitor 7. Since the higher voltage can thereby be applied to the field coil 2, a sufficient field coil current can flow therethrough, so that greater charging-up power can be obtained.

The reference numeral 10 denotes a flyback diode, by which, even when the voltage applied to the field coil 2 is suddenly interrupted, a current continues to flow through the field coil 2, so as to prevent a voltage surge from occurring across the field coil 2.

Figure 2:
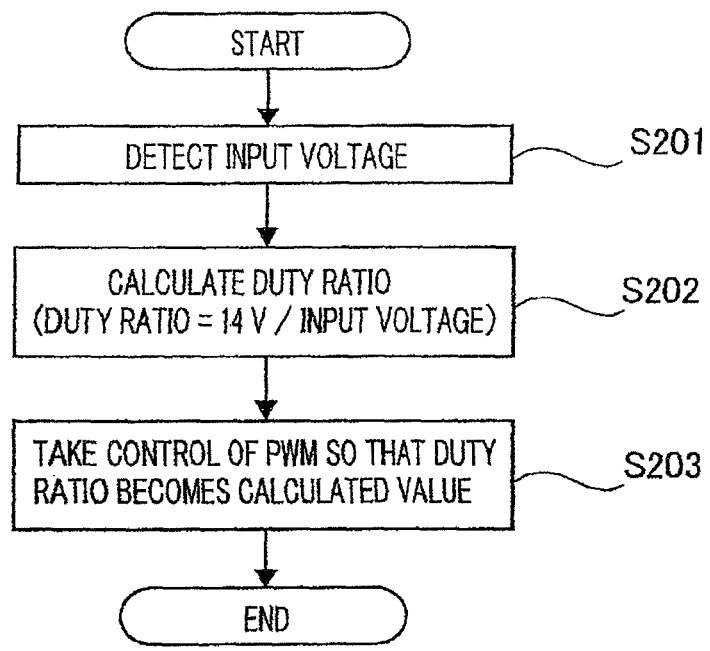
FIG. 2 is an operational flowchart for a DC-DC converter according to Embodiment 1 of the present invention.

FIG. 2 is a flowchart showing the operation of the DC-DC converter 5 according to above-described Embodiment 1 of the present invention. Its input, voltage is detected at the step S201 in FIG. 2. At the step S202, the duty ratio is continuously calculated based on the relation of duty ratio=14 V/input voltage. At the step S203, the switching circuit is controlled so that the duty ratio becomes a given calculated value, and then this routine is completed.

As described above, since a power supply system for motor vehicle according to Embodiment 1 of the present invention is configured in such away that the field coil is supplied with power obtained from both of the low voltage output terminal and the high voltage output terminal, the system is capable of regenerating equal or greater power compared to a case in which the field coil is supplied with power obtained only from the low voltage output terminal. Moreover, this configuration brings about such significant effects as the capacitor can be charged up without increasing the system size and resultantly pushing up the cost attributable to the countermeasure against overheating of the connector portion, as well as without regard to the voltage of the capacitor connected to the high voltage output terminal.

Embodiment 2

Figure 3:
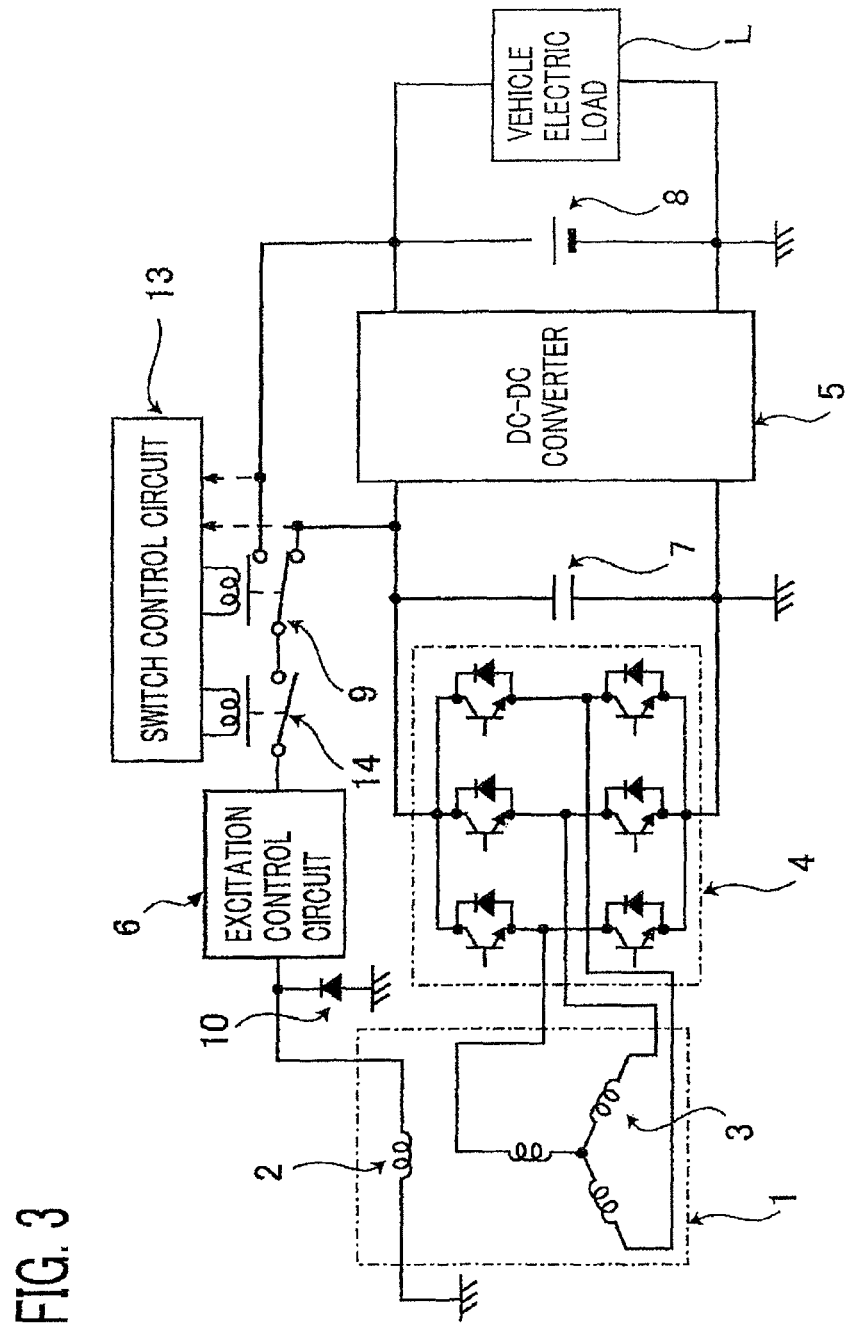
FIG. 3 is a system configurational view of a power supply system for a motor vehicle according to Embodiment 2 of the present invention.

FIG. 3 is a system configurational view of a power supply system for a motor vehicle according to Embodiment 2 of the present invention. In this Embodiment 2, explanations will be focused on the operations of the selection switch 9, a drive switch 14 and a switch control circuit 13. System configuration except for the selection switch 9, the drive switch 14 and the switch control circuit 13 is identical to that of Embodiment 1 shown in FIG. 1.

In FIG. 3, the selection switch 9 is a single-pole double-throw type relay, which makes its current-flow circuits selectable depending on conduction states thereof. The selection switch 9 is turned on and off by the switch control circuit 13. The selection switch 9 is connected to the capacitor 7 when it is turned off, and to the battery 8 when turned on.

The switch control circuit 13 has a function of detecting a first input voltage connected to the capacitor 7 and a second input voltage connected to the battery 8, and a function of turning on the selection switch 9 to connect to the battery 8 side when the voltage of the capacitor 7 is lower than that of the battery 8, and turning off the selection switch 9 to connect to the capacitor 7 side when the voltage of the capacitor 7 is higher than that of the battery 8, so that the voltage input to the excitation control circuit 6 becomes higher.

The drive switch 14 is a single-pole single-throw normal-open type relay, which can make its circuit conductive or nonconductive depending on conduction states thereof. The drive switch 14 is turned on and off by the switch control circuit 13. The drive switch 14 has a function of turning on the contacts thereof to make the circuit conductive when the vehicle is driven, and other than that, turning off to make the circuit nonconductive, whereby a leak current can be prevented from flowing when the vehicle is not in use, so as to avert electric corrosion. Moreover, it also has a maintenance function in which when, during maintenance, a user makes a request for removing the capacitor 7 to the switch control circuit 13 by pushing a button, not shown in the figure, connected to the switch control circuit 13, the switch control circuit 13 turns off the selection switch 9 to connect to the capacitor 7 and then turns on the drive switch 14 to make the circuit conductive, so that power stored in the capacitor 7 is consumed in the field coil 2, enabling the capacitor to be removed without performing hot-line work.

Figure 4:
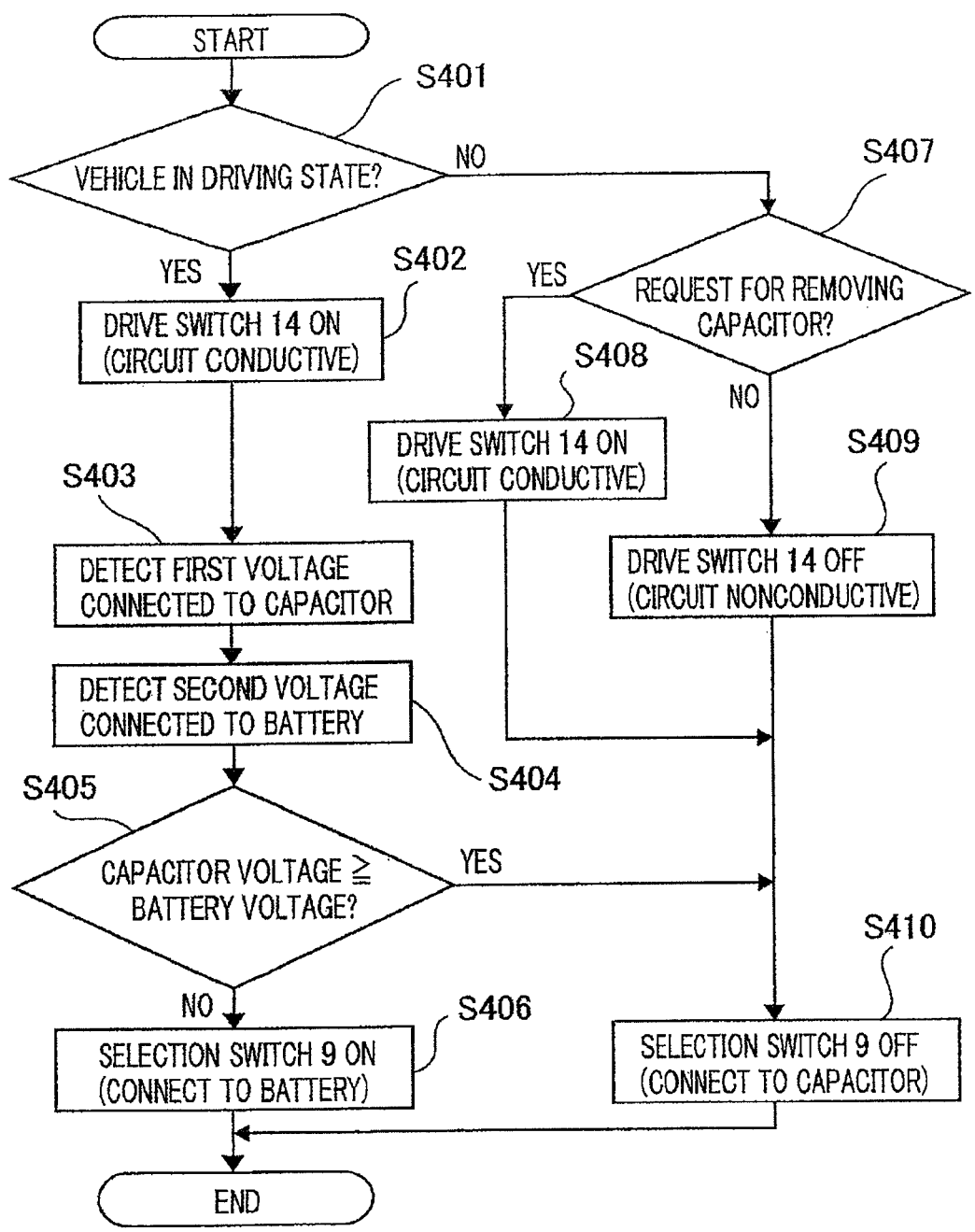
FIG. 4 is an operational flowchart for a switch control circuit according to Embodiment 2 of the present invention.

FIG. 4 is an operational flowchart for the switch control circuit 13 according to Embodiment 2 of the present invention. Driving states of the vehicle are determined in the step S401 in FIG. 4. When the vehicle is in a running state, the step S402 ensues, whereas in a stopping state, the step S407 ensues. In the step S402, the drive switch 14 is turned on to make the circuit conductive, and then the step S403 ensues. The first input voltage connected to the capacitor 7 is detected in the step S403, and then the step S404 ensues. The second input voltage connected to the battery 8 is detected in the step S404, and then the step S405 ensues. In the step S405, the detected values of the first and second input voltages are compared with each other.

When the voltage of the capacitor 7, which is the first input voltage, is not lower than that of the battery 8, which is the second input voltage, the step S410 ensues, whereas, when the voltage of the capacitor 7, which is the first input voltage, is lower than that of the battery 8, which is the second input voltage, the step S406 ensues. The selection switch 9 is turned on to select the battery 8 side in the step S406, and then the routine is completed.

In the step S407, whether or not a request for removing the capacitor 7 has been made is determined. If the request for removing the capacitor 7 has been made, the step S408 ensues. Then the drive switch 14 is turned on to make the circuit conductive, and the step S410 ensues. If no request for removing the capacitor 7 has been made, the step S409 ensues. Then the drive switch 14 is turned off to make the circuit nonconductive, and the step S410 ensues. In the step S410, the selection switch 9 is turned off to select the capacitor 7 side, and then the routine is completed.

As described above, since a power supply system for motor vehicle according to Embodiment 2 of the present invention is configured providing it with the switch control circuit 13 that takes control of selective switching by the selection switch 9 so that the voltage input to the excitation control circuit 6 becomes higher, the selective switching is automatically performed, thereby eliminating manual operation of the switch.

Moreover, when a request for stopping the system is made, the switch control circuit 13 takes control of the drive switch 14 to open, whereby the leak current flowing through the field coil 2 can be reduced, so that occurrence of electric corrosion can be brought under control.

Furthermore, since the switch control circuit 13 is configured in such a way that, when a user makes a request for removing the capacitor 7, the selection switch 9 is connected to the capacitor 7 side so that the field coil is energized to discharge the capacitor, even when maintenance work is needed with the capacitor 7 being charged up, the capacitor can be discharged, thereby eliminating hot-line work.

Embodiment 3

Figure 5:
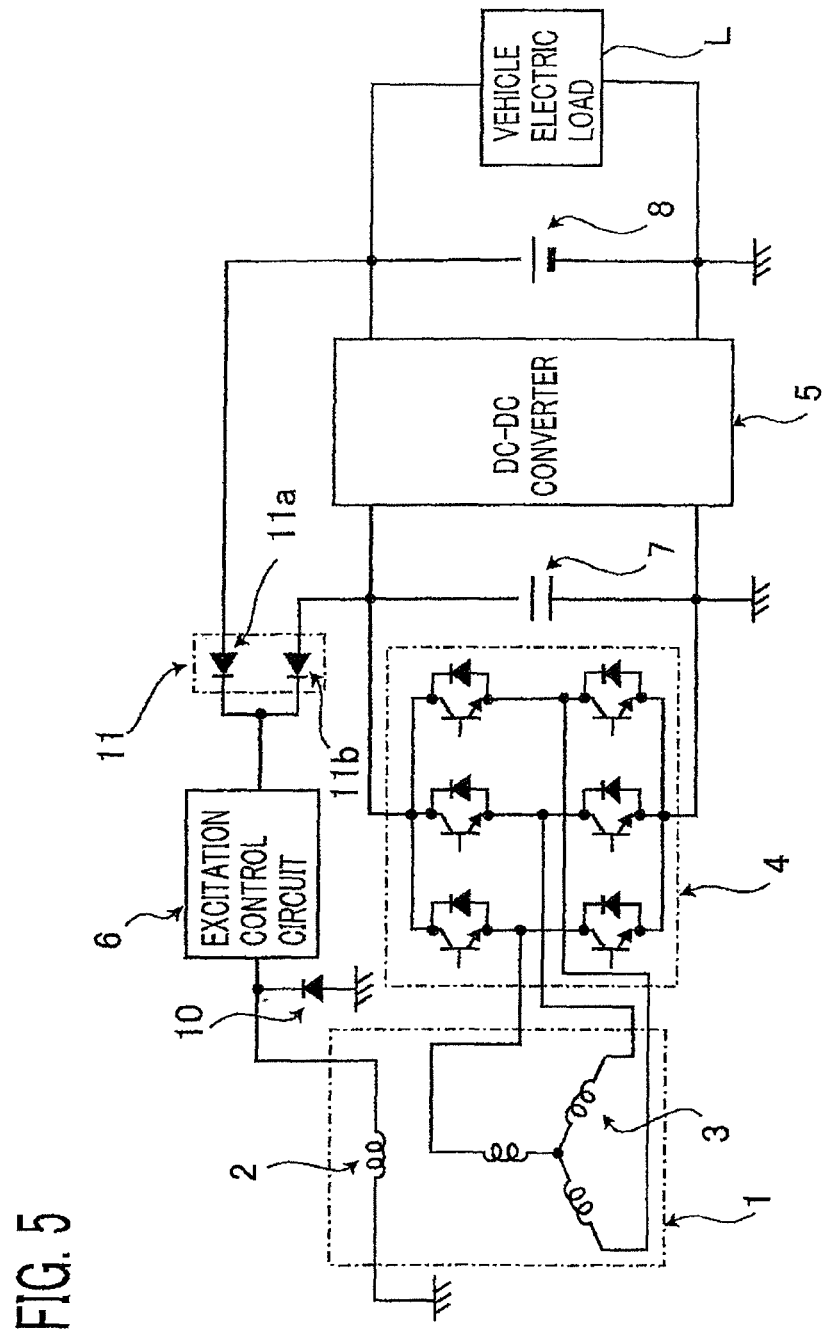
FIG. 5 is a system configurational view of a power supply system for a motor vehicle according to Embodiment 3 of the present invention.

FIG. 5 is a system configurational view of a power supply system for a motor vehicle according to Embodiment 3 of the present invention. In this Embodiment 3, explanations will be focused on power-selection diodes 11 shown in FIG. 5. System configuration except for the power-selection diodes 11 is identical to that of Embodiment 1 shown in FIG. 1. Embodiment 3 is configured providing it with the power-selection diodes 11 in place of the selection switch 9 in Embodiment 1.

As shown in FIG. 5, the power-selection diodes 11 each are connected between the excitation control circuit 6 and capacitor 7 and between the excitation control circuit 6 and the battery 8, whereby, when the voltage of the battery 8 is higher than that of the capacitor 7, a first power-selection diode 11*a* is turned on so that the field coil 2 is supplied with power from the battery 8. Meanwhile, when the voltage of the capacitor 7 is higher than that of the battery 8, a second power-selection diode 11*b* is turned on so that the field coil 2 is supplied with power from the capacitor 7.

According to this Embodiment 3, since selective switching is performed automatically by the power-selection diodes 11, manual switch operation can be eliminated. Moreover, since no switch control circuit is needed, the system can be manufactured at lower cost.

Embodiment 4

Figure 6:
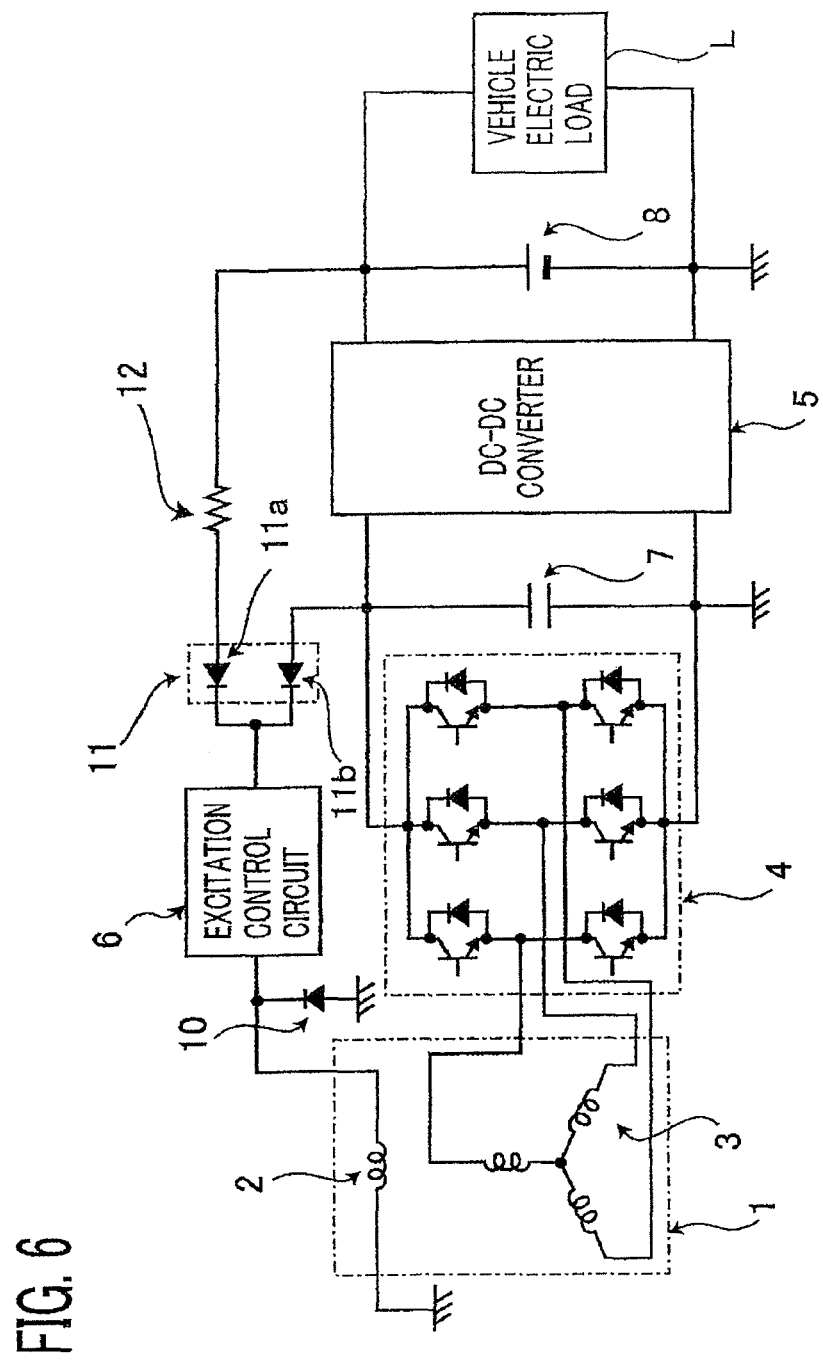
FIG. 6 is a system configurational view of a power supply system for a motor vehicle according to Embodiment 4 of the present invention.

FIG. 6 is a system configurational view of a power supply system for a motor vehicle according to Embodiment 4 of the present invention. In this Embodiment 4, explanations will be focused on a current-limiting resister 12 shown in FIG. 6. System configuration except for the current-limiting resister 12 is identical to that of Embodiment 3 shown in FIG. 5.

In FIG. 6, the reference numeral 12 denotes the current-limiting resister, which, connected between the battery 8 and the first power-selection diode 11*a*, limits a current flowing through the path connecting the battery 8 with the field coil 2. When the voltage of the battery 8 is higher than that of the capacitor 7, the first power-selection diode 11*a* is turned on, so that the field coil 2 is supplied with power from the battery 8. At this moment, since the current-limiting resister 12 consumes power, the current flowing through the closed path can be limited.

Therefore, according to this Embodiment 4, even when selective switching is performed so that the field coil is supplied with power from the battery, the capacitor 7 can be charged up without a large current flowing through the connector portion.

Embodiment 5

Although in Embodiment 1 to Embodiment 4 described above, explanations have been made on the systems provided with the generator 1 and the rectifier 4 that performs full-wave rectification of output power from the generator 1, this Embodiment 5 is configured using a motor-generator in place of the generator 1 shown in FIG. 1, FIG. 3, FIG. 5 and FIG. 6. Since system configuration except for the generator 1 and the rectifier 4 is identical to those of Embodiment 1 to Embodiment 4 shown in FIG. 1, FIG. 3, FIG. 5 and FIG. 6, explanations here will be focused on the operations of the motor-generator 1 and the rectifier 4.

In FIG. 1, FIG. 3, FIG. 5 and FIG. 6, the generator 1 is a motor-generator, which can serve as both generator by rotation force from outside and motor supplied with power from outside. The rectifier 4 is made up of transistors. While the motor-generator 1 is generating electricity, the rectifier 4 serves as a three-phase full-wave rectifier that rectifies three-phase AC power generated by the motor-generator 1. Conversely, when the motor-generator 1 is operating as a motor, the rectifier 4 serves as an inverter being driven by a transistor drive circuit, not shown in the figure, connected to the transistors.

When the motor-generator 1 is operated as a motor, torque output from the motor is determined by magnetic flux produced by the field coil 2 and that produced by the armature coil 3. Since the amount of magnetic flux produced by each coil is proportional to the amount of current that flows through each coil, the higher a voltage is applied thereto, the lager the current becomes. As described above, since the excitation control circuit 6 in Embodiment 1 to Embodiment 4 is configured to enable a higher voltage to be applied to the field coil 2, the motor-generator of this Embodiment 5 can not only produce lager torque but also be driven even when the voltage of the capacitor 7 is low, so that preferable starting characteristics can be obtained.

There are a variety of circuits for the DC-DC converter 5 according to the present invention. Any circuit may be adopted as far as the circuit can convert the input voltage into any DC voltage, and is not limited to the one described in the above embodiments according to the present invention.

There are also a variety of constructions for the selection switch 9 according to the present invention. Any configuration may be adopted as far as the voltage applied to the field coil 2 can be obtained from either the high voltage output terminal or the low voltage output terminal, and is not limited to the one described in the above embodiments according to the present invention.

Various modifications and alterations of this invention will be apparent to those skilled in the art without departing from the scope and spirit of this invention, and it should be understood that this is not limited to the illustrative embodiments set forth herein.

What is claimed is:

1. A power supply system for a motor vehicle, the power supply system comprising:
   a generator including:
      a rotor having a field coil which is rotated by an engine, and
      a stator having an armature coil;
   a rectifier for rectifying AC power generated in the armature coil into DC power;
   an excitation control circuit which controls a voltage applied to the field coil;
   a capacitor, connected to a DC side of the rectifier, for receiving and transferring the DC power;
   a battery connected to an electric load of the motor vehicle;
   a DC-DC converter connected between the capacitor and the battery and capable of converting unidirectionally or bidirectionally an input DC voltage into another DC voltage; and
   a selection switch which selectively connects the capacitor or the battery as a power supply source for the excitation control circuit.

2. A power supply system for a motor vehicle, the power supply system comprising:
   a generator including:
      a rotor having a field coil which is rotated by an engine, and
      a stator having an armature coil;
   a rectifier for rectifying AC power generated in the armature coil into DC power;
   an excitation control circuit which controls a voltage applied to the field coil;
   a capacitor, connected to a DC side of the rectifier, for receiving and transferring the DC power;
   a battery connected to an electric load of the motor vehicle;
   a DC-DC converter connected between the capacitor and the battery and capable of converting unidirectionally or bidirectionally an input DC voltage into another DC voltage;
   a selection switch which selectively connects the capacitor or the battery as a power supply source for the excitation control circuit; and a switch control circuit which controls selective switching by the selection switch, thereby enabling a higher value voltage to be input to the excitation control circuit.

3. A power supply system for a motor vehicle according to claim 2, further comprising:
a drive switch, controlled to open or close by the switch control circuit, for making the excitation circuit to the field coil conductive or nonconductive,
wherein the switch control circuit controls the drive switch to open when the motor vehicle is not driven.

4. A power supply system for a motor vehicle according to claim 2, wherein the switch control circuit controls the selection switch to connect to the capacitor and controls the drive switch to close for connecting to the capacitor, to energize the field coil so as to discharge the capacitor, when an input signal requesting to remove the capacitor is received.

5. The power supply system for the motor vehicle according to claim 1, wherein the DC-DC converter is connected between the DC side of the rectifier and the battery and converts a DC voltage input from the rectifier into the DC voltage of a lower level.

6. The power supply system for the motor vehicle according to claim 1, wherein the excitation control circuit is connected to the selection switch which selectively connects the capacitor or the battery to the excitation control circuit to supply a DC power from the battery or the capacitor, respectively.

7. The power supply system for the motor vehicle according to claim 2, wherein the switch control circuit controls the selection switch so that the voltage of the capacitor or the battery which has a higher voltage value, among voltage values of the capacitor and the battery, is input to the excitation control circuit.

* * * * *